United States Patent [19]

Ortega

[11] E Re. 30,224

[45] Reissued Mar. 11, 1980

[54] VALVE CONSTRUCTION

[75] Inventor: Robert Ortega, Fountain Valley, Calif.

[73] Assignee: Purex Corporation, Lakewood, Calif.

[21] Appl. No.: 874,575

[22] Filed: Feb. 2, 1978

Related U.S. Patent Documents

Reissue of:

[64] Patent No.: 3,938,553
Issued: Feb. 17, 1976
Appl. No.: 413,841
Filed: Nov. 8, 1973

[51] Int. Cl.[2] ..... F16K 11/085

[52] U.S. Cl. ..... 137/625.47; 137/876; 137/625.43; 251/DIG. 1

[58] Field of Search ..... 137/625.41, 625.47, 137/876; 251/310, DIG. 1

[56] References Cited

U.S. PATENT DOCUMENTS

| | | | |
|---|---|---|---|
| 255,881 | 4/1882 | Morrison | 251/310 X |
| 2,547,116 | 4/1951 | Gould | 251/309 |
| 2,621,886 | 12/1952 | Mueller | 137/625.47 |
| 2,631,002 | 3/1953 | Mueller | 251/310 |
| 2,702,050 | 2/1955 | Thomas | 251/310 X |
| 2,845,948 | 8/1958 | Parker | 137/625.41 X |
| 2,854,027 | 9/1958 | Kaiser et al. | 137/625.41 |
| 3,191,628 | 6/1965 | Kirkwood et al. | 137/625.43 |
| 3,538,952 | 11/1970 | Bayer | 137/625.17 |
| 3,540,694 | 11/1970 | Cornelius | 251/309 |

FOREIGN PATENT DOCUMENTS

| | | | |
|---|---|---|---|
| 899757 | 5/1972 | Canada | 137/625.47 |
| 1650382 | 10/1970 | Fed. Rep. of Germany | 137/625.4 |

*Primary Examiner*—Arnold Rosenthal
*Attorney, Agent, or Firm*—William W. Haefliger

[57] ABSTRACT

A valve having a valve body, a valve cavity, a first opening and a second opening with a valve member rotatably positioned within the valve cavity. The valve member may have a generally cylindrical hollow configuration with an end opening in alignment with the first opening, and a side opening with the valve member positioned for rotation to bring the side opening into or out of alignment with the second opening. A seal means is supported by the valve member in slidable contact with the valve cavity with the seal means enclosing the end opening and side opening of the valve member.

The valve body may also include a valve member opening in alignment with the valve member. A removable closure member is positioned over the valve member opening. On removal of the closure member, the valve member may be removed from the valve cavity by withdrawing the valve member through the valve member opening.

The valve body may also include a third opening with rotation of the valve member providing flow communication between the first and second openings or between the first and third openings. The seal means may enclose the second and third openings when the side opening of the valve member is in communication with either of the second or third openings.

16 Claims, 4 Drawing Figures

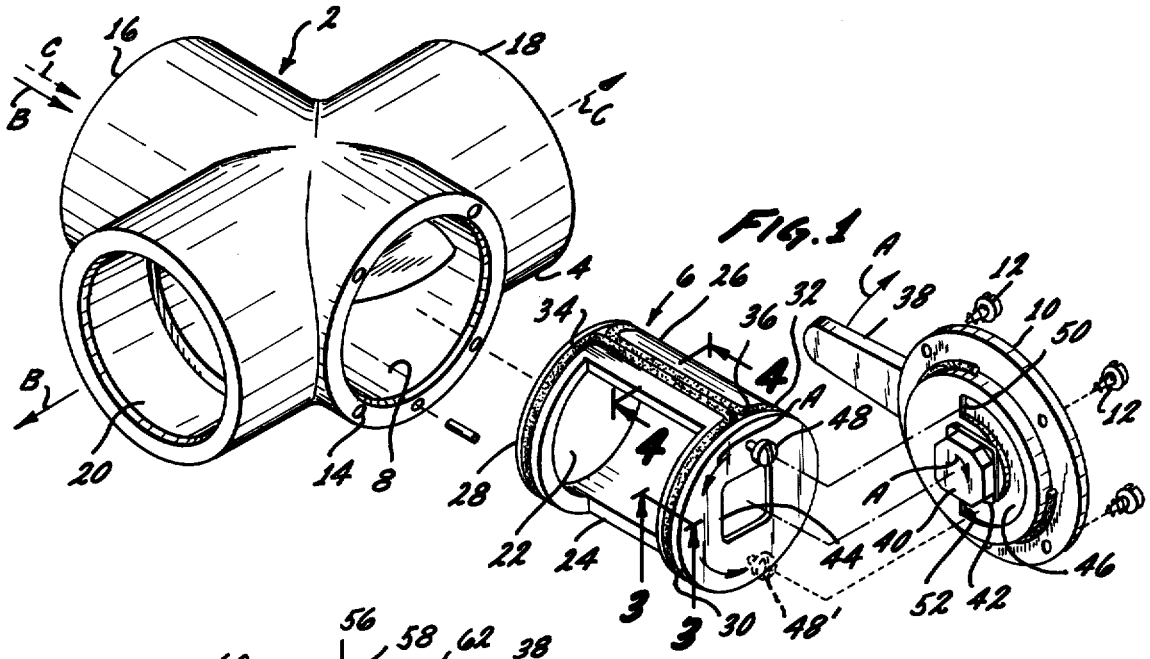
FIG. 1
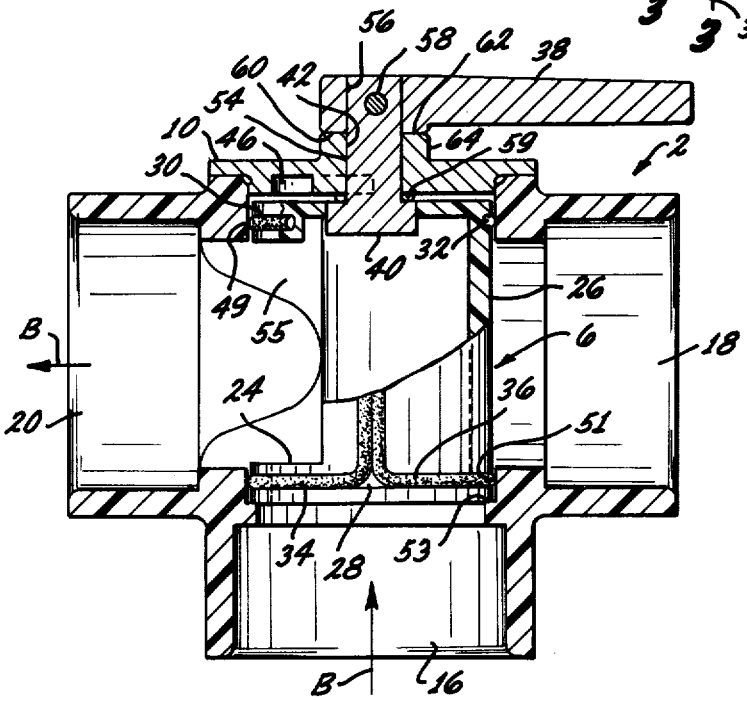
FIG. 2
FIG. 3
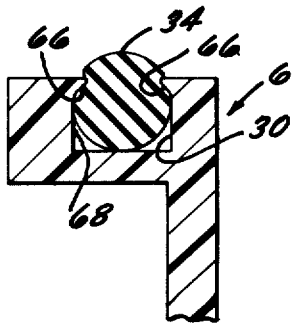
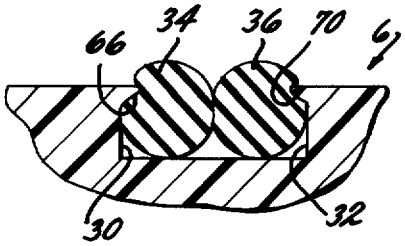
FIG. 4

VALVE CONSTRUCTION

Matter enclosed in heavy brackets [ ] appears in the original patent but forms no part of this reissue specification; matter printed in italics indicates the additions made by reissue.

The present invention pertains to a valve with a valve member having a generally cylindrical hollow configuration rotatably positioned within a valve body. The valve body includes first and second openings and a cavity in engagement with the valve member. An end opening in the valve member is in alignment with the first opening and a side opening in the valve member may be brought into or out of alignment with the second opening in the valve body. A seal means supported by the valve member is in slidable contact with the valve cavity with the seal means enclosing the end opening and the side opening. Thus, on rotation of the valve member, the side opening is brought into alignment with the second opening in the valve cavity to provide flow communication between the first and second openings while maintaining a positive seal between the valve member and the valve cavity about the end opening and side opening.

The valve body may also include a valve member opening positioned in alignment with the valve member with the valve member opening positioned generally opposite to the first opening in the valve body. A removable closure member is positioned over the valve member opening. On removal of the closure member, the valve member may then be withdrawn from the valve cavity through the valve member opening. This provides easy maintenance of the valve without having to disconnect the valve body from the piping with which it may be joined.

The present valve may also include a third opening in the valve body with rotation of the valve member providing flow communication between either the first and second openings or the first and third openings. When the valve contains a third opening, the seal means may enclose the third opening as well as the end opening and side opening in the valve member.

In providing a seal between the valve member and the valve cavity, the exterior surface of the valve member may include a first groove positioned about the end opening and a second groove positioned about the side opening with a portion of the second groove being common to the first groove. With seal means retained in the first and second grooves, the seal means lying in the common portion of the first and second grooves, thus, serves a common function in maintaining a positive seal with respect to both the end opening and side opening.

Additionally, a third groove may be formed in the exterior surface of the valve member with the third groove positioned about a third opening in the valve body when the side opening of the valve member is in alignment with the second opening in the valve body. A portion of the first groove may be common to the second groove, a portion of the first groove may be common to the third groove, and a portion of the second groove may be common to the third groove.

A first continuous seal member may be positioned in the second groove and a second continuous seal member may be positioned in the third groove. The first seal member will lie in the portion of the first groove which is common to the second groove. Similarly, the second continuous seal member will lie in the portion of the first groove which is common to the third groove. In this manner, the first and second continuous seal members may function to form a positive seal about the second and third openings in the valve body and also to form a positive seal about the first opening in the valve body. In forming a seal about the first opening in the valve body, the continuous seal members will also form a seal about the end opening in the valve member in alignment with the first opening in the valve body.

In further illustrating an embodiment of the invention, reference is made to the enclosed drawing in which:

FIG. 1 is an exploded view of a valve with a substantially cylindrical valve member positioned for rotation within a valve body with seal means on the valve member to maintain a positive seal between the valve member and openings in the valve body;

FIG. 2 is a partial sectional view of the valve of FIG. 1 illustrating grooves in the exterior surface of the valve member with seals positioned within the grooves;

FIG. 3 is a sectional view taken along line 3—3 of FIG. 1 to illustrate a groove in the exterior surface of the valve member with inward projections adjacent the groove opening for retention of a seal member within the groove, and FIG. 4 is a sectional view taken along line 4—4 of FIG. 1 to illustrate the retention of two seals within a grooved region in the surface of the valve member which is common to separate grooves which contain the individual seals.

Turning to FIG. 1, a valve 2 includes a valve body 4 with a valve member 6 retained within the body. The valve member 6, which is of a hollow, generally cylindrical construction, may be inserted within the valve body 4 through a valve member opening 8. After insertion of the valve member 6 within the valve body 4, the valve member is retained within the body by a removable closure 10. The closure 10 may be secured to the valve body 4 through any convenient means such as screws 12 which pass through apertures in the closure and engage threaded openings 14 in the valve body.

The valve body 4 includes a first opening 16, a second opening 18, and a third opening 20. The valve member 6 includes a side opening 24 and an end opening 22 in alignment with the first opening 16. On rotation of valve member 6 within the valve body 4, the side opening 24 may be brought into or out of alignment with either the second opening 18 or third opening 20. With side opening 22 in alignment with the third opening 20, liquid may flow through the valve 2 in the direction of the arrows denoted B. Liquid entering the first opening 16 may, thus, flow through end opening 22, side opening 24 and be discharged through the third opening 20. Liquid may, of course, also flow in the reverse direction, entering the valve 2 through third opening 20 and being discharged through the first opening 16.

On rotation of valve member 6 from its position indicated in FIG. 1, the side opening 24 may be brought into alignment with the second opening 18. With valve member 6 in this position, liquid may flow through the valve 2 in the direction indicated by arrows C with liquid entering through first opening 16, flowing through openings 22 and 24 in valve member 6, and being discharged through second opening 18. Again, of course, the flow of liquid may be reversed with liquid entering through second opening 18 and being discharged through the first opening 16.

The valve member 6 includes a closed cylindrical surface 26 which may be positioned opposite the side opening 24. Thus, when side opening 24 is in alignment with the third opening 20, the flow of liquid through second opening 18 is blocked by the surface 26. Conversely, when side opening 24 is in alignment with second opening 18, the flow of liquid through the third opening 20 is blocked by surface 26.

In forming a seal between the valve member 6 and valve body 4, a first groove 28, a second groove 30, and a third groove 32 may be formed in the exterior cylindrical surface of the valve member. As indicated, the first groove 28 surrounds end opening 22 in the valve member 6. Similarly, second groove 30 surrounds the side opening 24 while third groove 32 is positioned to surround either the second opening 18 or third opening 20 depending upon the position of the valve member 6.

The grooves 28, 30 and 32 have certain portions which are in common. Thus, the portion of second groove 30 which is positioned transverse to the axis of valve member 6 adjacent the end opening 22 is common to the first groove 28. Similarly, the transverse portion of third groove 32 adjacent the end opening 22 is common to first groove 28. The portions of second groove 30 and third groove 32 which are parallel to the axis of the valve member 6 are joined with the joined portions being common to both second groove 30 and third groove 32.

A first continuous seal member 34 is positioned within second groove 30 and a second continuous seal member 36 is positioned within third groove 32. Due to the construction of grooves 28, 30 and 32, the portion of the seal member 34 which lies in groove 28 performs a dual function in serving to maintain a positive seal about end opening 22 and also about side opening 24. Similarly, the portion of the seal member 36 which lies in the first groove 28 performs a dual function in providing a seal about end opening 22 and about second opening 18 or third opening 20 depending upon the position of valve member 6 within the valve body 4.

The portions of the first and second seal members 34 and 36 which are in juxtaposition in the common region where grooves 30 and 32 are joined also perform a dual function. In the common region, the effect of seal members 34 and 36 reinforces each other so as to form a double seal between second opening 18 and third opening 20.

To provide rotation of valve member 6 within valve body 4, a handle 38 may be provided with the handle connected to a crank end 40 which extends through an aperture 42 in the closure 10 to engage a crank opening 44 in the valve member. With the crank end 40 in engagement with crank opening 44, as indicated in FIG. 1, movement of handle 38 in the direction of the arrow A will cause a corresponding rotation in the crank end 40 which is also indicated by an arrow denoted A. Rotational movement of crank end 40 will, in turn, cause rotational movement of valve member 6 in the direction of an arrow denoted A. If handle 38 is moved in a direction opposite to that indicated by arrow A, this will, of course, cause a corresponding opposite rotation of crank end 40 and valve member 6.

In rotatably positioning valve member 6 within the valve body 4, a positioning groove 46 may be provided on the undersurface of closure 10. A stop screw 48 in the end surface of valve member 6 is retained within groove 46 such that the degree of rotation permitted the valve member is determined by terminus surface 50 and terminus surface 52 which demark the ends of the groove. With side opening 24 in alignment with third opening 20, as indicated in FIG. 1, the stop screw 48 will contact terminus surface 50. On rotation of the valve member 6 in the direction of the arrow A, the stop screw 48 is moved to the position indicated in phantom line drawing as 48'. At this point, stop screw 48 contacts the terminus surface 52 and the side opening 24 is then in alignment with second opening 18 such that the openings 16 and 18 are in flow communication.

When the stop screw 48 is positioned within groove 46 at a point intermediate terminus surface 50 and terminus surface 52, all of the openings 16, 18 and 20 will be in flow communication since a portion of side opening 22 will communicate with third opening 20 while a portion of the side opening communicates with second opening 18. The valve 2 is not generally designed for operation in this position and, thus, the stop screw 48 will generally be positioned at the ends of the groove 46 in contact with either surface 50 or surface 52.

FIG. 2 is a partial sectional view of the valve 2 in assembled condition with the parts of the valve positioned as indicated in FIG. 1. With the valve member 6 positioned within valve body 4, the exterior cylindrical surface of the valve member is positioned closely adjacent a cylindrical surface 49 defined by valve member opening 8 and also adjacent an upstanding cylindrical support surface 51 adjacent first opening 16. The upper end surface of valve member 6 also lies closely adjacent to the undersurface of closure 10 while the lower end surface of the valve member slidably engages a support surface 53 positioned adjacent opening 16.

With the valve member 6 positioned as shown in FIG. 2, the portions of seal members 34 and 36 which lie in planes transverse to the axis of the valve member are in contact with either cylindrical surface 49 or cylindrical surface 51. A partial cylindrical surface 55 formed within the valve body 4 is positioned closely adjacent the outer surface of the valve member 6. Contact of the seal members 34 and 36 with surface 55 provide a positive seal about the side opening 24 and a positive seal between the second opening 18 and third opening 20.

The handle 38, as described previously, is connected to crank end 40 through aperture 42. In securing handle 38 to the crank end 40, the crank end may be made integral with a crank arm 54 which extends through aperture 42. The crank arm 54 may be secured within an aperture 56 in handle 38 by any convenient means such as a pin connection 58. With crank arm 54, thus, held within handle 38, a lower handle surface 62 contacts an upper surface 60 of a supporting boss 64 on the closure 10. A seal member 59, such as an O-ring, may be positioned about the arm 42 between the lower surface of closure 10 and the upper surface of the crank end 40 to provide a seal around aperture 42.

FIG. 3, which is a sectional view taken along line 3—3 of FIG. 1, shows an enlarged view of the second groove 30 with the first continuous seal member 34 positioned within the groove. As shown, the groove 30 includes inward projections 66 formed by the groove sidewalls 68 adjacent the opening into the groove. The inward projections 66 grip the seal member 34 which is conveniently made of a resilient material such that the seal member can be pressed into groove 30 and held in place by projections 66.

FIG. 4 is a sectional view of the common region formed by joinder of the grooves 30 and 32 and is taken along line 4—4 of FIG. 1. The third groove 32, as well as first groove 28, may contain inward projections of the type illustrated in FIG. 3. Thus, in the common region formed by joinder of grooves 30 and 32, an inward projection 70 of the groove 32 may coact with the inward projection 66 on groove 30 in retaining seal members 34 and 36 within the common region. Both seal members 34 and 36 may be formed of a resilient material such that the seal members may be forced into position in the common region formed by grooves 30 and 32 and held therein by projections 66 and 70.

I claim:

1. A valve comprising:

a valve body having a cavity, a first opening, a second opening and a third opening;

a valve member rotatably positioned within said cavity;

said valve member having a generally cylindrical exterior surface and a hollow configuration with an end opening in alignment with said first opening;

a side opening in said valve member positioned at substantially a right angle with respect to said end opening with the valve member positioned for rotation about a cylindrical axis to bring the side opening into or out of alignment with the second opening or the third opening so as to establish flow communication between said first and second openings or between said first and third openings;

said side opening having a width which is sufficient to span the distance between said second and third openings such that the valve is always open with flow communication being provided between said first opening and both said second and third openings when the valve member is in an intermediate position in which said side opening is out of alignment with said second opening and out of alignment with said third opening;

a first groove in said exterior surface positioned in a substantially uniform spaced relation with respect to said end opening;

a second groove in said exterior surface positioned in a substantially uniform spaced relation to said side opening;

a portion of said second groove positioned at substantially a right angle to said first groove and a portion of said second groove being common to said first groove;

a third groove in said exterior surface;

said third groove positioned in a substantially uniform spaced relation about said third opening when said side opening is in alignment with said second opening;

said third groove positioned in a substantially uniform spaced relation about said second opening when said side opening is in alignment with said third opening;

said second groove positioned in a substantially uniform spaced relation about said third opening when said side opening is in alignment with said third opening;

a portion of said third groove positioned at substantially a right angle to said first groove;

a portion of said third groove being common to said first groove;

seal means retained in said first, second and third grooves;

the portion of said second groove which is substantially perpendicular to said first groove being common to the portion of said third groove which is substantially perpendicular to said first groove;

the seal means in the common portion of said second and third grooves performing a dual function of forming a positive seal about said side opening and also forming a positive seal between said second and third openings;

the seal means in the common portion of said first and second grooves serving a common function of maintaining a positive seal about both said end opening and said side opening;

the seal means in the common portion of said first and third grooves serving a common function of maintaining a positive seal about said end opening while maintaining a positive seal about said second or said third openings depending upon the rotational position of the valve member, and said common portion of said second and third grooves being positioned approximately midway between said second and third openings when said valve member is rotated to a position in which said side opening is in alignment with either said second or said third openings.

2. The valve of claim 1 including stop means associated with said valve member to fix the rotational position of said valve member with said side opening in alignment with either said second or said third opening.

3. The valve of claim 2 including a valve member opening in said valve body in alignment with said valve member;

said valve member opening positioned generally opposite said first opening; and a removable closure member positioned over said valve member opening, whereby said valve member may be removed from the valve cavity by removing the closure member and withdrawing the valve member through the valve member opening.

4. The valve of claim 1 including a constricted opening in said first groove;

a constricted opening in said second groove;

a constricted opening in said third groove, and said seal means retained within said first, second and third grooves by engagement with said constricted openings.

5. The valve of claim 1 wherein said seal means includes:

a first continuous seal member positioned in said second groove;

a second continuous seal member positioned in said third groove;

said first seal member lying in the portion of said first groove which is common to said second groove, and said second seal member lying in the portion of said first groove which is common to said third groove.

6. The valve of claim 5 including a constricted opening in said first groove;

a constricted opening in said second groove;

a constricted opening in said third groove, and said first and second continuous seal members positioned on said exterior surface and retained within said second and third grooves by engagement with said constricted openings.

*7. A valve comprising*

*(a) a valve body having a cavity, and first, second and third flow openings,*

*(b) a valve member rotatably positioned within said cavity, said valve member having a generally cylindrical hollow configuration with an end opening in alignment with the body first opening,*

*(c) the valve member having a side opening characterized in that the side opening is openly aligned with only the second body opening when the valve member is in a primary position whereby flow communication is provided between said first and second openings, and the side opening is openly aligned with only the third body opening when the valve member is rotated about 180° to a secondary position, whereby flow communication is then provided between said first and third openings,*

*(d) the side opening further characterized in that it becomes openly aligned with both the second and third body openings when the valve member is rotated intermediately of said primary and secondary positions,*

*(e) the valve member having an outer surface substantially the entirety of which is everywhere cylindrical about one axis defined as an axis of rotation of said valve member in said body, the second and third flow openings being substantially coaxial,*

*(f) and seal means sealing off between the body and valve member characterized in that a seal is established about the side opening and second opening in said primary position, and a seal is established about the side opening and third opening in said secondary position,*

*(g) the seal means located between the body and valve means and including two annular sealing surfaces extending about an axis defined by the cylindrical valve member, and two straight sealing surfaces intersecting the two annular sealing surfaces at opposite sides of said axis, said side opening in said member being cylindrically arcuate about said axis and extending into proximity to said two straight sealing surfaces.*

*8. The valve of claim 7 including stop means associated with the valve member to limit rotation thereof at each of said primary and secondary positions.*

*9. The valve of claim 7 wherein said seal means is carried by the valve member to be removable therewith upon removal of the valve member from the body.*

*10. The valve of claim 7 wherein said side opening in said member is cylindrically arcuate about said axis of rotation defined by said member, and terminates at locations at generally opposite sides of said axis of rotation.*

*11. The valve of claim 10 wherein the valve body defines an additional opening in axial alignment with the valve member, there being a removable closure positioned over said additional opening and removably attached to said body to allow withdrawal of the valve member from said body when the closure is detached therefrom.*

*12. The valve of claim 11 including stop means associated with said closure and the valve member to limit rotation of the valve member at each of said primary and secondary positions.*

*13. The valve of claim 11 including a valve member actuating handle attached to the valve member and projecting through said closure.*

*14. The valve of claim 7 wherein said second and third body openings are at opposite sides of said axis of rotation defined by the cylindrical valve member, and said first body opening is in axial alignment with said axis of rotation.*

*15. The valve of claim 7 wherein, said outer cylindrical surface is imperforate except at said side opening.*

*16. A valve comprising*

*(a) a valve body having a cavity, and first, second and third flow openings,*

*(b) a valve member rotatably positioned within said cavity, said valve member having a generally cylindrical hollow configuration with an end opening in alignment with the body first opening,*

*(c) the valve member having a side opening characterized in that the side opening is openly aligned with only the second body opening when the valve member is in a primary position whereby flow communication is provided between said first and second openings, and the side opening is openly aligned with only the third body opening when the valve member is rotated to a secondary position, whereby flow communication is then provided between said first and third openings,*

*(d) the side opening further characterized in that it becomes openly aligned with both the second and third body openings when the valve member is rotated intermediately of said primary and secondary positions,*

*(e) the valve member having an outer surface substantially the entirety of which is everywhere cylindrical about one axis defined as the axis of rotation of said valve member in said body, the second and third flow openings being substantially coaxial,*

*(f) seal means sealing off between the body and valve member characterized in that a seal is established about the side opening and second opening in said primary position, and a seal is established about the side opening and third opening in said secondary position, said seal means being carried by the valve member to be removable therewith upon removal of the valve member from the body, the seal means also sealing off between the valve member and body about the third opening in said primary position, and about the first opening in said secondary position,*

*(g) and grooves in the valve member to receive the seal means, the grooves including two annular grooves extending about an axis defined by the cylindrical valve member, and two straight grooves interconnecting the two annular grooves at opposite sides of said axis, said side opening in said member being cylindrically arcuate about said axis and extending into proximity to said two straight grooves.*

* * * * *